March 8, 1966     W. H. LUEHRMANN ETAL     3,239,311
PORTABLE SEEPS DETECTOR AND METHOD OF EXPLORATION
Filed March 26, 1962     3 Sheets-Sheet 1

INVENTORS
William H. Luehrmann
John S. Bradley
Eugene R. Brownscombe
BY Charles F. Steininger
Attorney INVENTORS
William H. Luehrmann
John S. Bradley
Eugene R. Brownscombe
BY Charles F. Steininger
Attorney

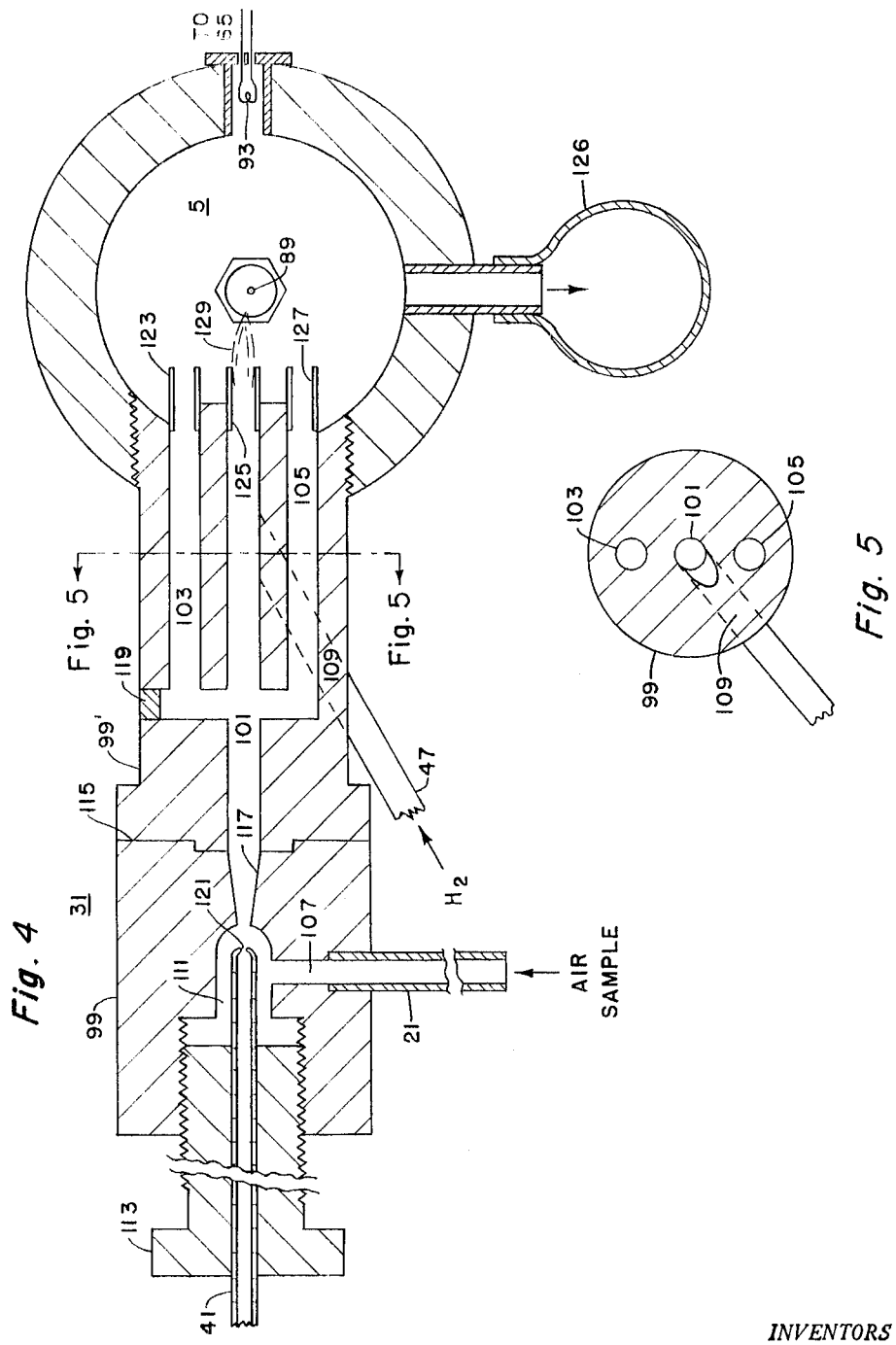

United States Patent Office 3,239,311
Patented Mar. 8, 1966

3,239,311
PORTABLE SEEPS DETECTOR AND METHOD
OF EXPLORATION
William H. Luehrmann, Irving, and John S. Bradley and Eugene R. Brownscombe, Dallas, Tex., assignors to The Atlantic Refining Company, Philadelphia, Pa., a corporation of Pennsylvania
Filed Mar. 26, 1962, Ser. No. 182,452
7 Claims. (Cl. 23—232)

This invention relates to a method and apparatus for locating petroliferous deposits. More particularly, the invention relates to a method and apparatus for conducting hydrocarbon seeps exploration in areas not suited to vehicular traverse.

Various types of infrared and flame ionization methods and equipment are used to locate naturally occurring seeps from petroliferous deposits; however, to date, these detecting systems and their power supplies are so large and cumbersome that they require vehicular transport of some type.

To overcome limited speed and cross-country mobility inherent in all types of vehicular transport, certain seeps detecting systems are mounted in aircraft. However, the advantages of increased speed and mobility are offset to some extent by the necessity of flying grid patterns with relatively large intervals between grid lines. Because of this large grid interval, airborne seeps detection is limited to reconnaissance-type surveys made to locate areas of interest in large regions and provinces. Therefore, neither air-borne nor vehicular seeps detection is capable of locating a majority of the small, naturally occurring seeps in areas not suited to vehicular travel. In fact, even in areas with fairly adequate road networks, small seeps exploration cannot be performed satisfactorily if the terrain is such that the vehicle cannot leave the roads. This is especially true in many areas where small seeps are on the order of 0.1 to 0.01 cubic foot per hour. When the detection of seeps this size becomes important, even sensitive detectors capable of detecting 0.1 p.p.m. must be brought within approximately 25 feet of the seep before the hydrocarbon plume can be detected. Since road networks do not provide such access to all portions of a given area of interest, presently available detecting systems cannot be used for locating small seeps.

Accordingly, it is an object of the present invention to provide an improved method and apparatus for exploring for subsurface petroliferous deposits.

Another object of this invention is to provide an improved method and apparatus for locating subsurface petroliferous deposits by detecting changes in the hydrocarbon content of the atmosphere.

Another object of this invention is to provide an improved method and apparatus for locating subsurface petroliferous deposits by detecting changes in hydrocarbon content of the atmosphere over terrain not suited to vehicular traverse.

Another object of this invention is to provide an improved method and apparatus for detecting gas from small naturally occurring hydrocarbon seeps.

Another object of this invention is to provide an improved method of searching for small seeps in areas where it is undesirable or impossible to traverse the entire suspect area.

Another object of this invention is to provide an improved and truly portable total hydrocarbon detector suitable for human portage.

Another object of this invention is to provide an improved, highly sensitive total hydrocarbon detector suitable for human portage and adapted for continuous sampling operations.

Another object of this invention is to provide an improved aspirator which can act to continuously supply sample gas to a flame ionization detector.

These and other objects and advantages of the present invention will become apparent from a detailed description of the invention and its variations.

Applicants have invented a novel method and apparatus for locating small seeps in even the most inaccessible areas. The method and apparatus have overcome serious prior art problems which have heretofore prevented the location of these small seeps. Prior art gas analyzers with (1) a sensitivity necessary to locate small seeps, (2) a continuous operating life of at least eight hours, and (3) a capacity to sample continuously with a minimum of sample mixing are so large that they are restricted to use in laboratories and on suitable load carrying vehicles. Applicants' novel seeps detecting apparatus possesses the above-recited characteristics and yet is small enough to be carried on the back of its operator. The novel method of using this apparatus in exploring for small seeps takes advantage of the portions of the terrain of interest most suited to the accumulation of seeps. In addition, the method continuously samples, with minimum mixing, the atmosphere immediately above the surface of the portions of the terrain traversed.

Considering the first aspect of the method in more detail, it has been found that part of the problem of detecting small, widely scattered seeps can be solved by selecting predetermined routes along the area of interest prior to conducting the seeps survey. Selection of these routes becomes particularly important in cases where it is impractical to traverse all of the area of interest, due to surface conditions or time limitations. The routes selected are usually chosen on the basis of preliminary reconnaissance information that is initially used to selected the area of interest from a large region of possible interest. However, regardless of the source of the information used, the routes are selected to cover the portions of the area most suitable to seep accumulation. In most cases, the area's drainage system, i.e., creek beds, stream beds, river beds, etc., is the portion most likely to contain seeps. Of course, when the area is mountainous or heavily vegetated, this drainage system also contains the most convenient routes for traversing the area. In any event, it has been determined that seeps are much more likely to appear in drainage systems than in portions of areas adjacent the systems since gaseous hydrocarbons percolate up from subsurface petroliferous deposits and seek the paths of least resistance, i.e., faults, cracks, fissures, etc., in the earth's crust. These subsurface faults, etc., usually form the drainage systems on the earth's surface and therefore by traversing the system in the areas of interest, the paths of least resistance are monitored.

Considering other aspects of the method in more detail, it has been determined that continuously sampling the atmosphere immediately above the surface of the portion of the area traversed is essential in detecting small seeps. Applicants have found that methane and other hydrocarbons emanating from seeps exist in the atmosphere in small segments or transitory slugs. These segments or slugs tends to rise from the seeps in loose plume-like configurations but surface winds usually distort or destroy the configurations dispersing the segments into relative isolated portions of the atmosphere. The smaller the seep the more dispersed the segment under a given set of conditions. Because of the transitory nature of these methane segments the atmosphere must be sampled immediately above the surface of the portion of the area traversed to minimize wind effects. Since the method visualizes almost continuous traverse, the apparatus practicing the method must be capable of continuously sampling the atmosphere as its moves along the surface of the area of interest. As this sampling takes place, it is essential that the methane segments in the atmosphere sampled be passed to the detector with a minimum of dilution with the atmosphere. Prior art detectors conventionally mix these segments with the atmosphere during the sampling operation and the segments are therefore diluted below the threshold of detectability of even the most sensitive detectors.

Briefly described, the invention contemplates a method of exploration for naturally occurring petroliferous deposits located below the surface of the earth by detecting with a portable flame ionization detector transient hydrocarbon segments in the atmosphere emanating from small naturally occurring seeps by (a) selecting a suspect area of interest in an area inaccessible to vehicular travel, (b) continuously sampling atmosphere immediately above the area of interest's surface, (c) burning at least a portion of the atmosphere sampled and producing, according to the flame ionization principle, an electrical signal indicative of the total amount of hydrocarbons present in the sampled atmosphere, (d) detecting the presence of hydrocarbons above the area of interest's hydrocarbon background level, and (e) indicating the presence as diagnostic of gas from naturally occurring seeps.

The following drawings and accompanying description will disclose the preferred embodiments of the invention.

FIGURE 4 shows a cross section of the aspirator and the burning chamber.

Figure 1:
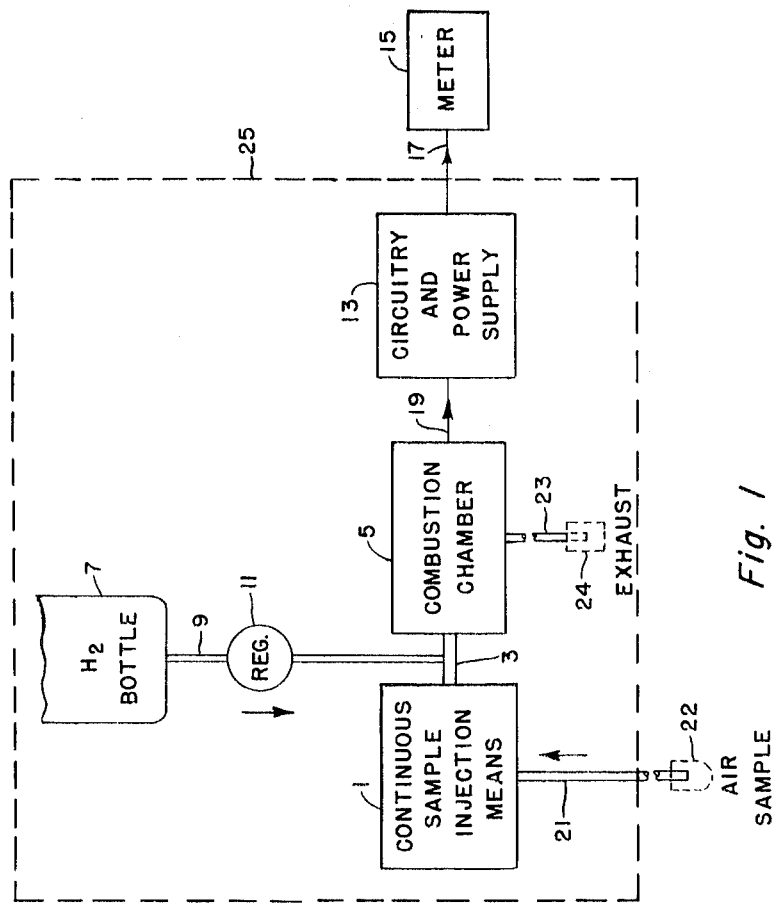
FIGURE 1 shows a block diagram of the portable hydrocarbon detector.

FIGURE 5 shows a sectional drawing of the aspirator. Refer now to FIGURE 1 showing a basic block diagram of the improved, highly portable total hydrocarbon detector. The detector includes continuous sample injection means 1 connected through pipe 3 to combustion chamber 5. Hydrogen bottle 7 is connected through pipe 9 to regulator means 11 to pipe 3. Electrical circuitry and power source 13 is electrically connected to meter 15 by 17 and to chamber 5 by 19. Air sample intake 21 and pressure damper 22 are connected to injection means 1 and exhaust means 23 and pressure damper 24 are connected to combustion chamber 5. Dashed block 25 indicates the portion of the detector suitable for mounting on a pack frame. Meter 15 can be carried in hand or on the detector proper.

Figure 2:
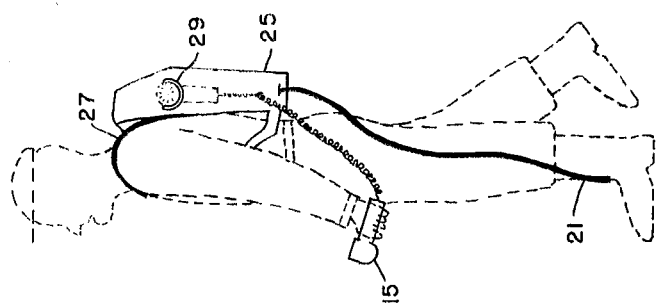
FIGURE 2 shows the detector in operating position.

FIGURE 2 shows the over-all detector in operating condition with portion 25 mounted on pack frame 27. Meter 15 is normally secured in clamp 29 on the side of 25. Air sample hose 21 is shown secured to the operator's bootlace in a manner to sample air close to the ground.

Figure 3:
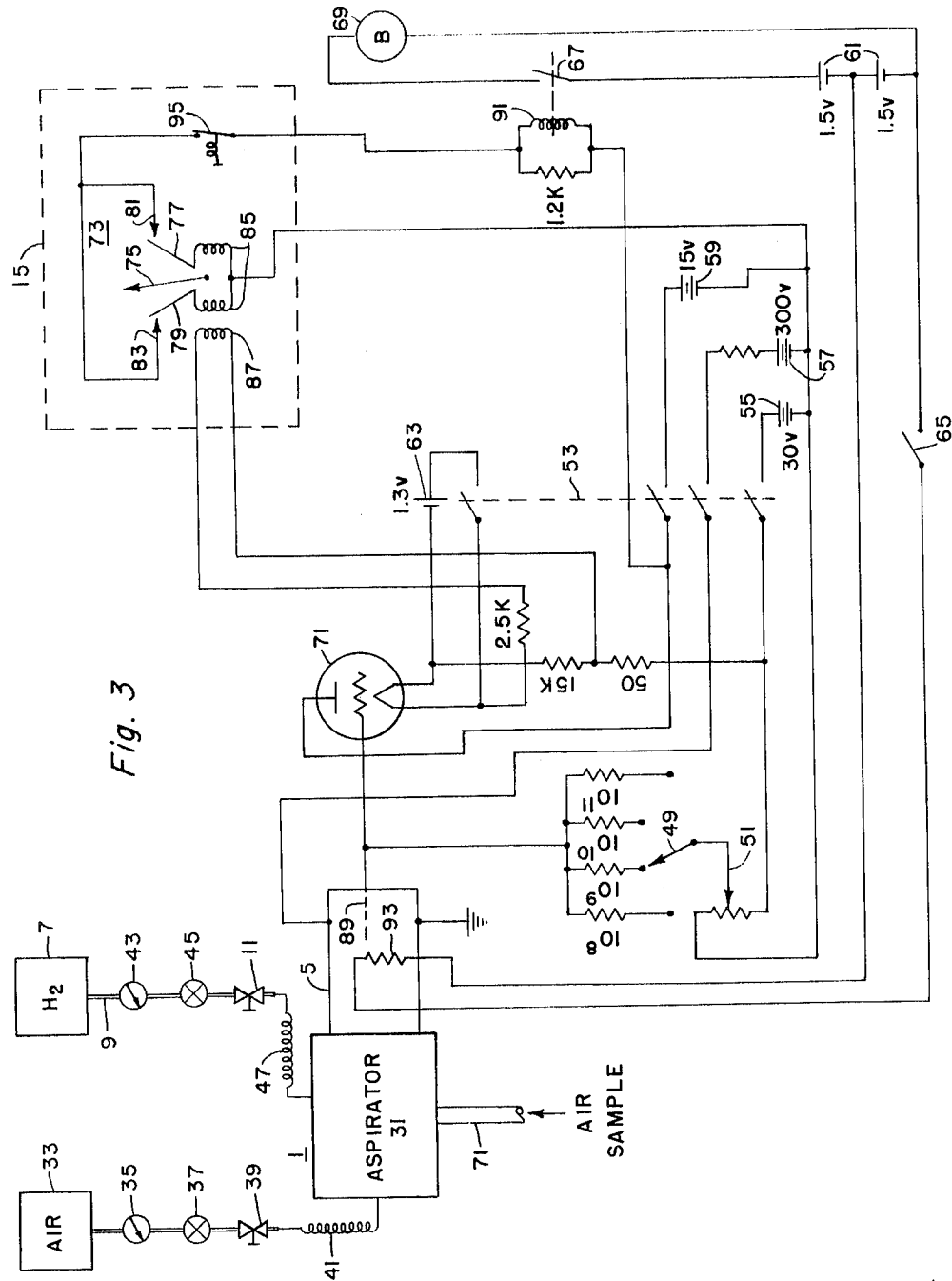
FIGURE 3 shows a flow diagram and a circuit diagram of the preferred embodiment of the detector.

For the preferred embodiment of the detector, refer now to FIGURE 3 showing the electrical and mechanical instrumentation of the invention. The over-all detector as shown weighs approximately 20 pounds (including pack frame) and measures approximately 30 by 18 by 6 inches. The overall power pack provides continuous operation for at least eight hours; however, the operating life of individual components in the pack varies. For instance, the batteries are good for several hundred hours of operation while the hydrogen and air bottles are good for 24 and 8 hours, respectively. Components in FIGURE 3 corresponding to those in FIGURE 1 utilize the same identifying numbers. Continuous sample injection means 1, FIGURE 1, is represented in FIGURE 3 by aspirator 31, and air bottle 33 connected through gauge 35, valve 37, regulator 39 and capillary tube 41 to the aspirator. Valve 37 is used to control the motivating force, in this case the air supply, and pressure meter 35 is used to monitor the pressure of the air flow to aspirator 31. Capillary tube 41 is connected between regulator 39 and aspirator 31. The capillary tube is preferably a stainless steel tube approximately 5 feet in length and is adapted to smooth out pressure fluctuations between the air supply and the aspirator. Hydrogen bottle 7 is connected through pipe 9, gauge 43, valve 45, regulator 11 capillary tube 47, and via aspirator 31 to burning chamber 5. Regulators 11 and 39 are conventional commercially available pressure regulators designed to insure constant flow of gas at a predetermined pressure. Burning chamber 5 is a commercially available flame ionization buring chamber such as sold by Perkin-Elmer Corporation of Norwalk, Connecticut. Valve 45 controls the hydrogen supply and meter 43 monitors the hydrogen pressure. Capillary tube 47 and regulator 11 function similarly to tube 41 and regulator 39. Tube 47 is connected to aspirator 31 as shown. The electronic circuitry in the detector includes the portion of the circiut mounted on the pack and a portion of the circuit contained in handset 15, FIGURE 1.

The portion of the circuit mounted on the back-pack includes sensitivity scale selector 49, background buckout control 51, ganged operating switch 53, voltage supplies 55, 57, 59, 61 and 63, starter or ignitor switch 65, buzzer switch 67, buzzer 69 and amplifier tube 71. Handset 15 includes meter 73 comprising meter needle 75, meter switches 77 and 79, meter contacts 81 and 83, relay lock coils 85 and meter operating coils 87. Looking at the electronic circuit in more detail, sensitivity scale selector 49 is connected between collector 89 in burning chamber 5 and the grid of tube 71. The purpose of 49 is to adjust the sensitivity of the reading made by meter 73. Potentiometer 51 connected between 49 and battery source 55 is used to adjust the buckout voltage overcoming background signal in the area of interest. Operating switch 53 is ganged as shown and is normally in the closed position wherein 30 volts is applied to potentiometer 51, 300 volts is applied to burning chamber 5, 15 volts is applied to the plate of tube 71 and to relay 91 operating switch 67, and 1.3 volts is applied to the cathode of tube 71. Starter switch 65 is normally in the open position and is closed to connect voltage source 61 to ignitor wire 93 in burning chamber 5. Buzzer switch 67 operated by relay 91 is normally in the open position and when closed applies 1.5 volt source 61 to buzzer 69. Meter 73 in handset 15 is operated by coils 87 connected in the cathode circuit of tube 71. Meter switch 77 or 79 is held against its respective contact 81 or 83, by lock coil 85 when needle 75 "pegs" 81 or 83. When 81 or 83 closes on its respective contact, voltage source 59 causes relay 91 to close buzzer switch 67 and activate buzzer 69.

Although the electrical circuit can be instrumented by various well known components, the following components are used in the preferred embodiment of the invention. Tube 71 is a commercially available Victoreen VX-55 and meter 73 is a commercially available 20-microampere meter relay with locking coils.

Refer now to FIGURE 4 which shows a cross section of aspirator 31 connected to burning chamber 5.

The novel aspirator unit offers unexpected advantages and improvements over sample pumping units in conventional flame ionization detector units. The Venturi-type aspirator provides a continuous supply of sampled air in a manner to prevent the methane segment within sample intake 21 from being diluted by the surrounding column of sampled air. In addition, the aspirator provides continuous sampling operations with a significant saving in the detector systems over-all weight and bulk by eliminating the requirement for a sample pump, a motor and the power source necessary to operate the motor.

The preferred embodiment of aspirator 31 includes brass body 99 with communication channels 101, 103, 105, 107 and 109, chamber 111 and adjustable bolt 113 containing stainless steel tubing 41. Body 99 is approximately 1.84 inches long with a 0.5 inch O.D. The communication channels are .0625 inch I.D. and tubing 41 is .0625 inch O.D. While the recited dimensions set forth the preferred embodiment, other dimensions can be used. Bolt 113 is secured to 99 by rotating 113 in the threaded portion of chamber 111. Chamber 111 is in communcation with air sample channel 107 and main channel 101. Channel 101 is divided into channels 103 and 105 which parallel a portion of channel 101. Channel 101 is joined by hydrogen channel 109 as indicated. In order to simplify the construction of the over-all aspirator and the drilling of channels therein, body 99 is divided into two portions along joint 115 as shown. After the converged portion 117 of 101 is drilled and chamber 111 is drilled and threaded, 99 and 99' can be soldered into position along line 115. After channels 101, 103 and 105 have been drilled in body 99', and their junctures completed, plug 119 is inserted as shown. Stainless steel tubing 41 is fixed in bolt 113 and positioned in 111 by rotating 113 until orifice 121 is the desired distance from mouth of 117. Alternatively, 113 can be rotated to the desired position and 41 moved through 113 until orifice 121 is the desired distance from the mouth of 117. Regardless of how the desired distance is established, it is made to equal approximately ten times the diameter of orifice 121.

Stainless steel tubing nozzles 123, 125 and 127 in channels 101, 103 and 105 are used to adjust the amount and direction of air flow into burning chamber 5. Various diameters and nozzle configurations can be used to vary the amount and direction of this flow. The preferred embodiment uses 125 to supply a mixture of sample air, carrier air and hydrogen which is burned by flame 129. Nozzles 123 and 127 introduce excess sample and carrier air to maintain proper combustion. If additional sensitivity is desired, the communication channels can be modified so all of the air sample and some carrier air and hydrogen are sent through 125. The excess carrier air and hydrogen is then sent separately through 123 and 127. In any event, the preferred nozzle size is approximately .020 inch I.D.

Since it is essential to move methane segments through sample tube 21 with minimum dilution of the segments with the surrounding air column, the movement of the air sample through 21 must be as fast as possible. The amount of air sample moved is a function of the vacuum in aspirator chamber 111 and the diameter and length of sample tube 21. To attain the necessary vacuum in 111 the highest possible mass ratio must be developed in the aspirator. The mass ratio can be defined as the ratio of the amount of air sample moved through 107 to the amount of driving air moved through 41. It has been found that a mass ratio of at least two should be developed for satisfactory small seeps detection. To produce this desired ratio it is necessary to limit orifice 121 to a diameter of at least .004 inch for an aspirator with aspirator dimensions as described heretofore. If desired, aspirator design can be optimized by changing the configuration of 117 so that its smallest diameter is maintained for approximately .05 inch before it diverges into the larger diameter of 101.

To prevent pressure pulses from appearing in burning chamber 5 pressure dampers 22 and 24 are placed in air sample line 21 and exhaust 23, as shown in FIGURE 1. The dampers are shown in dotted lines since they are optional. However, if the detector is not operating in ideal surroundings, gusty wind or even a change in wind direction produces pressure pulses in chamber 5 which momentarily alter the flow rate causing spurious signal indications. Of course, if the pressure pulses are large enough, they will blow out flame 129 in the burning chamber. In the preferred embodiment, air sample damper 22 is a 0.5 inch O.D. perforated brass nozzle filled with glass wool and is connected to the intake end of 21. Exhaust damper 24 is a 0.5 inch O.D. perforated nozzle filled with three turns of 200 mesh stainless steel wire screen. The nozzle is surrounded by a foam rubber cover 0.5 inch thick and is attached to the end of exhaust 23.

Let us now consider the conduct of a small seep survey using the device shown in FIGURE 3.

Although the invention is not limited in its operation, for purposes of illustration, let us assume that the detector is to be used in terrain where its unique characteristics can be utilized to the fullest. For instance, consider the requirement to locate small naturally occurring seeps in a vast unexplored region. An initial air-borne reconnaissance-type survey, such as disclosed in copending application 85,081, now Patent No. 3,143,648, owned by a common assignee, is made to locate areas of interest that should be further investigated. Assume that a 20 square mile area of interest is located by the reconnaissance survey; however, this area is covered by dense vegetation, by mountainous terrain or other geographical or man-made conditions that prevent vehiclular traverse. Since the area cannot be traversed by vehicle, the portable seeps detector must be used. Maps, photographs and aerial photographs of the area of interest, along with other available pertinent information, are used to determine a survey route that covers the portions of the area of interest most likely to contain seeps. That is, maps and aerial photographs are used to locate the drainage systems, photographic lineations, etc., that are usually indicative of faults, fissures, etc., through which seeps commonly occur. With this information available, a survey route is developed and the survey party, preferably a geologist, a detector and a detector operator, are transported to a suitable starting point in the area of interest.

After insuring that the equipment is in order, the detector is started in the following manner. Air control valve 37 is opened and pressure regulator 39 is adjusted until air pressure gauge 35 reads 28 pounds. With a pressure of 28 pounds at gauge 35, a pressure drop of 3 to 5 pounds is developed across orifice 121, FIGURE 4. The flow rate through 121 is approximately 75 to 100 cc., per minute. Hydrogen control valve 45, FIGURE 3, is opened and regulator 11 is adjusted until pressure meter 43 reads approximately 16 pounds. Capillary tube 47 reduces the hydrogen pressure to approximately that of the air sample in channel 101, FIGURE 4. The hydrogen flow rate is approximately 50 cc. per minute. After both pressures have been established, ignitor button 65, FIGURE 3, is depressed applying 1.5 volts to platinum filament 93. This ignites the hydrogen in combustion chamber 5 producing an audible pop indicating that the combustion chamber is operating. Sensitivity selector switch 49 is adjusted to the desired scale, usually the most sensitive. Gang switch 53 is depressed applying voltage sources 55, 57, 59 and 63 to their respective circuits. With the actuation of switch 53, needle 75 in meter 73 pegs upscale or downscale depending on the setting of sensitivity controller 49 and the hydrocarbon background content of the starting area. Needle 75 is pegged due to an inductive kick developed in the electronic circuit when voltage is initially applied. Needle release button 95 is temporarily depressed, breaking the holding circuit and allowing the release of needle 75 and switch 67. After the needle is released, sensitivity adjustment 49 is moved until needle 75 comes onscale and reads approximately 20 percent full scale. Thus, with this setting, the hydrocarbon background in the area produces a reading of approximately 20 percent. Since in most seeps exploration operations exact readings are not desired and only noticeable changes above background concentration are of interest, no attempt is made to adjust scale sensitivity device 49 until true hydrocarbon content is recorded on meter 73. Of course, if such reading is desired, a source of known hydrocarbon content is used to make the proper sensitivity adjustments on 49 and 73. In any event, the device's overall operability is tested by injecting several slugs of methane or other hydrocarbons into the atmosphere to see if the system detects and indicates the presence of methane by pegging meter 73 and activating buzzer 69. With the detector in proper operating order it is placed on the operator's back and air sample tube 21 is positioned as near the ground as possible, preferably under the bootlace of the operator's boot as shown in FIGURE 2. The operator then proceeds to traverse the predetermined survey path along the selected stream beds, stream lines, etc., until the alarm buzzer alerts the operator to the presence of methane. After the buzzer sounds, the operator takes handset 15 from clip 29 on the backpack and momentarily depresses switch 95 to release buzzer switch 67 and needle 75. He then traverses the general area in a zig-zag fashion until the buzzer again is actuated. The above steps are repeated until the operator is able to determine the exact location of the seep on the ground. Of course, if the seep is located in a shallow water-covered area the bubbling caused by the methane leaving the water will indicate the presence of the seep; however, if the seep is located in mud or in a dry area, the exact location is usually more difficult and requires continued survey of the area giving due consideration to wind direction and drift of the gas. After the seep is located, it is noted on a map or strip chart carried by the operator and the exploration traverse is continued as described heretofore.

In examining a particular area of interest during the initial survey or after the buzzer indicates methane in the area, the operator can most effectively inspect the area by walking so the heel of his boot mounting the sample hose stirs up the surface and releases seep gas trapped in the ground.

Considering now the detailed operation of the preferred embodiment, let us assume that the operator is traversing an area of interest and that the detector is opering as described heretofore. Regulator 39 maintains driving air from source 33 at a constant pressure of 16 pounds at the top of capillary tube 41. The tube shoots out pressure surges that tend to occur and drops the pressure to approximately 3 pounds at the mouth of 117, FIGURE 4. The force of the air flow through the small .004 inch diameter orifice 121 and into 117 produces a partial vacuum in chamber 111 causing the air sample containing methane segments to flow through sample tube 21 and channel 107 according to Bernouilli's Law.

The driving air from source 33, FIGURE 3 and the air sample from 107, FIGURE 4, are forced through 117, 101 and parallel channels 103 and 105. The flow of hydrogen from source 7, FIGURE 3, is regulated as described above and reaches channel 109 at about atmospheric pressure. The mixture of hydrogen and air sample in 101 burns at the end of nozzle 125 after the mixture is ignited as was described heretofore. Excess air and burned gases are exhausted from burning chamber 5 through exhaust 23, FIGURE 1. Moisture developed during the combustion process is collected in water trap 126, FIGURE 4. The detecting portion of the device acts as a carbon counter and detects hydrocarbon content in the air sample according to conventional flame ionization principle. That is, the current developed in collector 89, FIGURE 4, is proportional to the number of carbon atoms in the sample burned by flame 129 and collected by 89. For a given set of operating conditions the flame acts as a constant current generator of high internal impedance with an output voltage proportional to the load resistor (setting of 49) into which it is delivering current. Tube 71, FIGURE 3, which is an electrometer tube is used in cathode follower fashion to match the impedance of the resistor used in 49 with the resistance of meter 73.

When a methane segment is burned by flame 129 the carbon atoms in the methane are burned producing a current which produces a voltage above the background bucking voltage generated by 51. This voltage causes needle 75 to peg and activate buzzer 69.

While the preferred structure and method of operation have been described above, it will be understood that various modifications may be made without departing from the scope of the invention which is limited only by the claims appearing below.

We claim:
1. A method of exploration for hydrocarbon seeps indicative of naturally occuring petroliferous deposite comprising
   (a) selecting a suspect area of interest inaccessible to vehicular traffic based on an initial reconnaissance of a larger area including same,
   (b) traversing at least a portion of said area of interest along the drainage system thereof,
   (c) using a gaseous driving force to continuously aspirate samples of the atmosphere from immediately above the ground along the path of traverse,
   (d) combining hydrogen with said atmospheric samples subsequent to aspiration,
   (e) burning said samples according to the flame ionization technique,
   (f) producing an electrical signal indicative of the total amount of hydrocarbons present in said samples,
   (g) bucking out the portion of said electrical signal which represents the background level of hydrocarbons in said area,
   (h) detecting the presence of the portion of said electrical signal representing hydrocarbons above said background level, and
   (i) indicating said presence as diagnostic of a hydrocarbon seep.

2. A method of exploration according to claim 1 where the gaseous driving force is compressed air.

3. A method of exploration according to claim 2 where the ratio of the amount of atmospheric samples aspirated to the amount of driving air is at least 2 to 1.

4. A portable flame ionization hydrocarbon seeps detector adapted for continuous sampling operations comprising
   (a) a source of compressed carrier gas,
   (b) a pressure regulator means to control the flow of carrier gas,
   (c) a sample gas intake means,
   (d) an aspirator means with its input connected to said carrier gas source for continuously aspiring sample gas through a throat connection to said intake means,
   (e) an output means from said aspirator means,
   (f) a source of compressed hydrogen connected to said output means,
   (g) a pressure regulator means to control the flow of hydrogen,
   (h) a burning chamber including a collector and ignitor connected to said output means,
   (i) an amplifier electrically connected to said collector,
   (j) a sensitivity selector electrically connected between said collector and amplifier,
   (k) a potentiometer electrically connected to said selector for producing a buckout voltage,
   (l) voltage supplies connected to said ignitor, said amplifier, and said potentiometer,
   (m) a meter device electrically connected to said amplifier for indicating the probable presence of a hydrocarbon seep, and (n) an exhaust means including a water trap connected to said burning chamber.

5. A flame ionization detector according to claim 4 where the output means from the aspirator means consists of a plurality of parallel channels.

6. An improved aspirator adapted to continuously supply a small volume of sample gas to a flame ionization detector comprising
(a) a source of compressed carrier gas,
(b) a venturi tube with its input connected to said carrier gas source,
(c) a first channel connected to the constricted portion of said venturi tube for introducing sample gas,
(d) an output means from said venturi tube downstream to the constricted portion leading the flame ionization detector,
(e) a source of compressed hydrogen, and
(f) a second channel connected to said output means for introducing hydrogen from said source.

7. An aspirator according to claim 6 where the output means from the venturi tube consists of a plurality of parallel channels.

References Cited by the Examiner
UNITED STATES PATENTS

| | | | |
|---|---|---|---|
| 600,077 | 3/1898 | Horsley | 230—95 |
| 2,077,538 | 4/1937 | Wait | 23—255 |
| 2,991,158 | 7/1961 | Harley | 23—232 |
| 3,027,241 | 3/1962 | Andreateh et al. | 23—232 |
| 3,049,409 | 8/1962 | Dower | 23—232 |
| 3,088,809 | 5/1963 | Boatman | 23—232 |

OTHER REFERENCES

Thompson, "J. Chromatography" 2, 148–154, 1959.

MORRIS O. WOLK, *Primary Examiner.*

MAURICE A. BRINDISI, *Examiner.*